(12) United States Patent
Clancy et al.

(10) Patent No.: US 12,226,964 B2
(45) Date of Patent: Feb. 18, 2025

(54) IN AND RELATING TO COMPOSITE MANUFACTURING

(71) Applicant: UNIVERSITY OF LIMERICK, Limerick (IE)

(72) Inventors: Gearóid Clancy, Limerick (IE); Ronan O'Higgins, Limerick (IE); Paul Weaver, Limerick (IE)

(73) Assignee: UNIVERSITY OF LIMERICK, Limerick (IE)

( * ) Notice: Subject to any disclaimer, the term of this patent is extended or adjusted under 35 U.S.C. 154(b) by 5 days.

(21) Appl. No.: 17/442,848

(22) PCT Filed: Mar. 27, 2020

(86) PCT No.: PCT/EP2020/058762
§ 371 (c)(1),
(2) Date: Sep. 24, 2021

(87) PCT Pub. No.: WO2020/193764
PCT Pub. Date: Oct. 1, 2020

(65) Prior Publication Data
US 2022/0184898 A1     Jun. 16, 2022

(30) Foreign Application Priority Data

Mar. 27, 2019 (GB) .................................... 1904264

(51) Int. Cl.
*B29C 70/38* (2006.01)
*B29B 15/12* (2006.01)
(Continued)

(52) U.S. Cl.
CPC ............ *B29C 70/388* (2013.01); *B29B 15/12* (2013.01); *B29C 70/543* (2013.01); *D02J 1/18* (2013.01)

(58) Field of Classification Search
CPC ..... B29C 70/38; B29C 70/382; B29C 70/384; B29C 70/386; B29C 70/388; B29C 70/543
See application file for complete search history.

(56) References Cited

U.S. PATENT DOCUMENTS 5,698,066 A * 12/1997 Johnson .............. B29C 53/8016
156/499
2007/0101564 A1   5/2007 Nestler et al.
(Continued)

FOREIGN PATENT DOCUMENTS

| CN | 106536800 A | 3/2017 |
|---|---|---|
| EP | 3219474 A1 | 9/2017 |

(Continued)

OTHER PUBLICATIONS

PCT International Search Report and Written Opinion for International Application No. PCT/EP2020/058762, dated Jul. 2, 2020, 14 pages.

(Continued)

*Primary Examiner* — George R Koch
(74) *Attorney, Agent, or Firm* — Hoffman Warnick LLC

(57) ABSTRACT

A spreading apparatus for use with fibre-reinforced composite tapes, and related methods are disclosed. The spreading apparatus comprises an input side to receive an incoming tape to be spread, and an output side from which tape is delivered after spreading. The apparatus further comprises a tape heater (150, 250, 650) to in use apply heat to a tape; and a tape spreader (100, 1, 200, 600) to in use to apply contact pressure to the heated tape to thereby spread the tape.

11 Claims, 7 Drawing Sheets

(51) Int. Cl.
*B29C 70/54* (2006.01)
*D02J 1/18* (2006.01)

(56) References Cited

U.S. PATENT DOCUMENTS

2017/0305077 A1* 10/2017 Nakai .................... B29C 65/08
2018/0044827 A1* 2/2018 de Weerd ................ D02J 1/18
2019/0389148 A1* 12/2019 Wadsworth ....... B29C 66/81451

FOREIGN PATENT DOCUMENTS

WO 8400351 A1 2/1984
WO 2018168202 A1 9/2018

OTHER PUBLICATIONS

Great Britain Search Report for Application No. GB1904264.7, dated Sep. 13, 2019, 3 pages.
Chinese Office Action for Application No. 2020800400845, dated Aug. 31, 2023, 28 pages.

* cited by examiner

IN AND RELATING TO COMPOSITE MANUFACTURING

TECHNICAL FIELD

The present disclosure concerns spreading apparatuses and methods for use with fibre-reinforced composite tapes, for example, spreading apparatuses and the methods useful in Automated Tape Placement (ATP) processes of composite manufacturing.

BACKGROUND

Automated Tape Placement with in-situ consolidation of carbon fibre/thermoplastic prepreg tapes is an out of autoclave manufacturing method that can produce high quality composite parts. Using ATP allows control of fibre orientation and makes it possible to produce Variable Angle Tow (VAT) laminates, where fibres are orientated in curvilinear paths to improve stress distribution/align with desired structural paths. Laminates constructed in this way can thus provide performance benefits without increasing weight, but are prone to defects which include fibre wrinkling, fibre pull-up, gaps and overlaps.

Example embodiments consistent with this disclosure address the above-mentioned or related shortcomings.

SUMMARY

According to the present disclosure, there is provided an apparatus and a method as set forth in the appended claims. Other features of the invention will be apparent from the dependent claims, and the description which follows.

In one aspect, there is provided a spreading apparatus for use with fibre-reinforced composite tapes, the spreading apparatus comprising an input side to receive an incoming tape to be spread, and an output side from which tape is delivered after spreading, and further comprising: a tape heater to in use apply heat to a tape; and a tape spreader to in use to apply contact pressure to the heated tape to thereby spread the tape.

In one example, the tape is spread by the tape spreader such that its in-plane thickness is reduced after spreading, but its width is increased.

In one example, the fibre-reinforced composite tapes comprise a thermoplastic resin. In one example, the fibre-reinforced tapes comprise carbon fibres. In one example, the fibre-reinforced composite tapes comprise prepreg resin-carbon fibre composite tapes.

In one example the tape heater is arranged to apply heat to the incoming tape in order to raise its temperature and render it more easily deformable under contact pressure from the tape spreader.

In one example, wherein the tape heater comprises a heat source arranged to supply heat indirectly to an incoming tape.

In one example, the tape heater comprises a tape-heating surface that is in use heated by a heat source, and wherein tape received at the input side contacts the tape-heating surface such heat is applied to the tape by conduction from the tape-heating surface.

In one example, the tape heater comprises a heat source arranged to apply radiative heat to the tape. In one example, the tape heater comprises a laser. In one example, the tape heater comprises an infrared radiator. In one example the tape heater comprises a hot gas source, for example a hot air source.

In one example, the heat source is controllable to maintain the tape-heating surface at a steady temperature as tape passes to the tape spreader.

In one example, the heat source is controllable to maintain the tape-heating surface at a steady temperature corresponding to the melting temperature of a thermoplastic component of the tape.

In one example, the heat source is controllable to maintain the temperature of the tape at the tape spreader at a steady corresponding to the melting temperature of a thermoplastic component of the tape.

In one example, the heat source is configured with a temperature sensor, and is operable to maintain the heated surface at a steady temperature using feedback control, and/or to maintain the tape at a steady temperature at the tape spreader.

In one example the heat source comprises an electric heater cartridge, or a hot gas torch.

In one example, the tape spreader comprises a platen against which the tape is pressed.

In one example the platen comprises a planar surface against which the tape is pressed. In one example the platen comprises a metallic surface against which the tape is pressed. In one example the platen comprises a H13 tool steel surface. In one example the platen comprises a polished surface against which the tape is pressed. In one example the platen comprises a non-stick coating.

In one example the platen is integrated with the tape heater.

In one example the platen of the tape spreader comprises the tape-heating surface of the tape heater.

In one example the platen and tape-heating surface comprise a single piece of material. In one example the platen and tape-heating surface present an uninterrupted surface over which the tape passes.

In one example, the tape spreader comprises a compaction shoe to press sections of tape against the platen to thereby spread the tape.

In one example, the compaction shoe comprises a generally planar surface to press a section of the tape against the platen to thereby spread that tape at that section.

In one example, the compaction shoe is driven by an actuator to move in to and out of contact with the tape in use.

In one example the compaction shoe comprises a metallic surface against which the tape is pressed. In one example the compaction shoe comprises a H13 tool steel surface. In one example the compaction shoe comprises a polished surface against which the tape is pressed. In one example the compaction shoe comprises a non-stick coating.

In one example, the tape spreader comprises a roller to compress the tape.

In one example, the roller is driven by an actuator to move in to and out of contact with the tape in use.

In one example, the tape spreader comprises a roller to compress the tape against a platen, for example a cylindrical roller.

In one example the roller comprises a metallic surface against which the tape is pressed. In one example the roller comprises a H13 tool steel surface. In one example the roller comprises a polished surface against which the tape is pressed. In one example the roller comprises a non-stick coating.

In one example the tape spreader comprises opposed rollers.

In one example, the actuator(s) are pneumatically driven.

In one example, the spreading apparatus comprises a sensor and controller operable to provide pressure control feedback for the actuator of the tape spreader.

In one example, the spreading apparatus comprises a plurality of tape spreaders.

In one example, the tape spreader comprises one or both of: an incoming guide positioned on the input side and configured to stabilize the incoming tape; and an outgoing guide positioned on the output side and configured to stabilize the outgoing tape.

In one example the incoming guide and/or outgoing guide is a self-adjusting actuated guide.

In one example, the tape spreading apparatus comprises a tape feed controller configured to regulate movement of the tape from the input side to the output side in use.

In another aspect, there is provided an Automated Tape Placement apparatus for in-situ consolidation of fibre-reinforced composite tapes, comprising a spreading apparatus as herein described In another aspect, there is provided a method of spreading fibre-reinforced composite tapes, the method comprising: receiving an incoming tape to be spread; applying heat to the tape; applying contact pressure to the heated tape, thereby spreading the tape; and outputting spread tape.

In another aspect there is provided a method of spreading fibre-reinforced composite tapes, performed using a tape spreading apparatus as herein described.

In another aspect, there is provided a method of forming a composite component, the method comprising spreading a fibre-reinforced composite tape prior to consolidation in an Automated Tape Placement process, the spreading comprising a method as herein described.

Although a few preferred embodiments of the present invention have been shown and described, it will be appreciated by those skilled in the art that various changes and modifications might be made without departing from the scope of the invention, as defined in the appended claims.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 3 shows related steered carbon fibre tows with gaps in between;

DETAILED DESCRIPTION OF DRAWINGS

Figure 1:
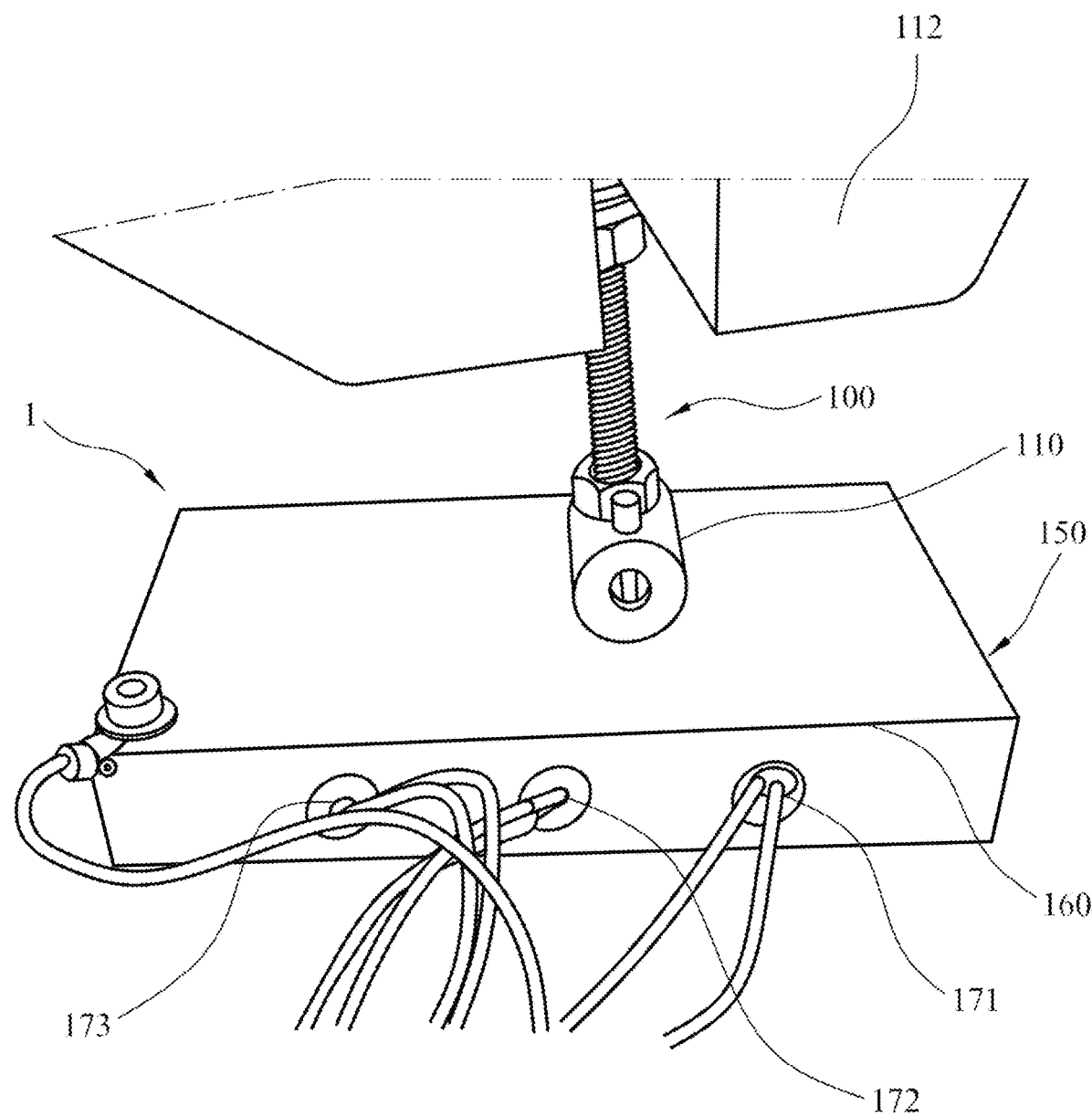
FIG. 1 shows a spreading apparatus for fibre-reinforced composite tapes, according to an example embodiment.

FIG. 1 shows a spreading apparatus 1 for fibre-reinforced composite tapes, according to an example embodiment. The spreading apparatus 1 is useful for spreading fibre-reinforced composite tapes, such as carbon fibre-reinforced prepreg tapes used in ATP manufacturing processes. The spreading apparatus 1 comprises an input side to receive an incoming tape to be spread, and an output side from which tape is delivered after spreading. The apparatus further comprises a tape heater 150 on the input side to in use apply heat to a tape, and a tape spreader 100 on the output side to in use to apply contact pressure to the heated tape to thereby spread the tape. The tape heater 150 applies heat to the incoming tape in order to raise its temperature and render it more easily deformable under contact pressure from the tape spreader 100.

Contact pressure from the tape spreader 100 reduces the in-plane thickness of the tape, spreading the tape out so that it is of larger width when delivered from the output side of the spreading apparatus 1, as compared to the width of the tape received at the input side. By controlling the spreading apparatus to spread the tape to different widths, the incidence of gaps, overlaps and wrinkles in composite components that are manufactured from the tape, such as through an ATP process, can be reduced. This is particularly advantageous, as described in more detail later, when the tape is used in the manufacture of composite components comprising at least one curved surface.

The tape heater 150 comprises a platen 160 which is heated with three heater cartridges 171,172,173. In the tape spreader 1 of FIG. 1 the heater cartridges 171,172,173 are electrical heating elements, controlled to maintain the temperature of the platen 160 at a sufficiently high temperature that tape received at the input side is heated as it moves across the platen 160, reaching the melting point, or other suitable predetermined temperature according to the nature of the matrix material of the composite tape, by the point at which the tape spreader 100 applies contact pressure thereto. For example, the tape may comprise a thermoplastic resin matrix comprising PEEK, and in this case the tape heater 150 is arranged so that the heater cartridges 171,172,173 maintain the platen 160 at 343° C., corresponding to the melting temperature of PEEK.

The tape spreader 100 comprises a compaction shoe 110 that is movable in to and out of contact with sections of tape as the tape passes across the platen 160, between the input side of the tape spreading apparatus 1 and the output side. The compaction shoe 110 is of fixed geometry, in the example embodiment of FIG. 1 comprising a cylindrical form that is arranged generally perpendicular to the direction of movement of tape through the spreading apparatus 1. The platen 160 is generally planar, providing a smooth, uninterrupted surface over which the tape passes, is heated by, and against which it is pressed by the compaction shoe 110. The compaction shoe 110 is aligned parallel to the surface of the platen 160 to enable an even pressure to be applied across the width of the tape. The pressure applied to the tape by the tape spreader 100 is controlled by applying different weights to the top of the compaction shoe 110. FIG. 1 shows part of a weight 112.

In order to reduce the chance of damage to the fibres in the tape as the tape is spread, the surfaces of the tape spreader 100 that contact the tape comprise polished H13 tool steel. A layer of non-stick coating applied thereto serves to further reduce problems associated with the tape sticking to the surfaces of the tape spreader 100. It will be appreciated that the platen 160 and tape-heating surface may comprise a single piece of material.

By conservation of volume of material, the reduction in thickness of the tape caused by the pressure from the compaction shoe 110 and the platen 160 on the top and bottom sides thereof results in a reduction in in-plane thickness of the tape, and therefore an increase in width of the tape as the tape is spread. As will be appreciated, by controlling the temperature, amount of pressure and the time over which pressure is applied as the tape passes between the input side and the output side of the tape spreading apparatus 1, it is possible to control the amount of spreading that takes place, including such that a tape of constant width and thickness received at the input side of the tape spreading apparatus may be delivered from the output side with varied width and thickness along its length.

Figure 2:
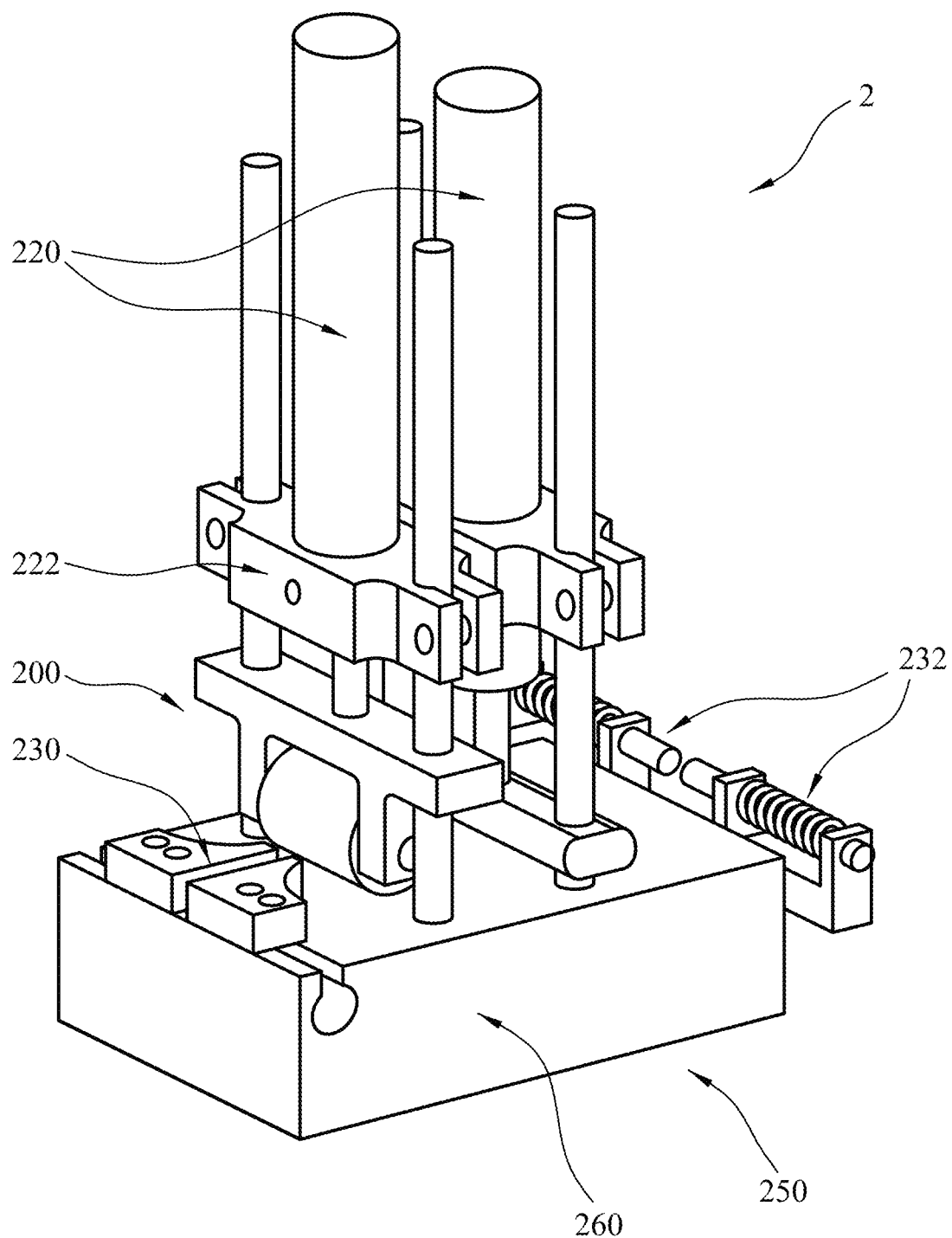
FIG. 2 shows a spreading apparatus for fibre-reinforced composite tapes, according to another example embodiment.

FIG. 2 shows a spreading apparatus 2 for fibre-reinforced composite tapes according to another example embodiment. The spreading apparatus 2 comprises a tape heater 250 on the input side to in use apply heat to a tape, and a tape spreader 200 on the output side to in use to apply contact pressure to the heated tape to thereby spread the tape, these components generally corresponding to the equivalent components shown in FIG. 1. The tape heater 250 comprises a heat source incorporated with the platen 260, the platen providing a heating surface which raises the temperature of incoming tape as the tape passes over it. The tape spreader 200, however, comprises two spreading stages. An actuator unit 220 enabling the amount of contact pressure and the way that the pressure is applied to be more readily controlled as tape passes through the spreading apparatus 2. The tape spreading apparatus 2 comprises an actuator clamp arrangement 222 to stabilize the actuators of the actuator unit 220.

Additionally, the spreading apparatus 2 comprises an incoming guide 230 and an outgoing guide 232 that in use respectively guide tape as it is received at the input side of the spreading apparatus 2 and delivered from the output side of the spreading apparatus 2. The incoming guide 230 is positioned on the input side of the spreading apparatus 2 and stabilizes the incoming tape, and the outgoing guide 232 is positioned on the output side of the spreading apparatus 2 and is configured to stabilize the outgoing tape. The incoming guide 230 and the outgoing guide 232 are self-adjusting actuated guides of the type generally known for use in tape handling operations.

The first tape spreading stage comprises a cylindrical roller aligned parallel to the surface of the platen 260, but with its axis perpendicular to the direction of movement of tape through the tape spreading apparatus 2. The pressure imparted on the tape by the first spreading stage is governed by a first actuator 220. The first actuator is pneumatic. The advantage of pneumatic actuators over other governing means such as weights is that pneumatic actuators may vary the pressure applied to the tapes in a consistent and straightforward fashion.

The second tape spreading stage comprises a compaction shoe with a generally planar compaction surface to contact the tape and press it against the platen. The pressure imparted on the tape by the second spreading stage is governed by a second actuator 220. The second actuator is pneumatic. The compaction surface of the compaction shoe is arranged generally parallel to the platen. The compaction shoe comprises curved portions alongside the planar surface, curving away from the platen. The curved portions are generally smoothly curved, to reduce the impact that the edges of the planar surface have on the surface of the tape as it is compress, and/or as the compaction shoe is separated from the tape after applying pressure thereto.

As mentioned for the tape spreading apparatus 1 of FIG. 1, through control of the amount of heating, the amount and way that pressure is applied to the tape to regulate the amount of spreading that takes place in the spreading apparatus 2.

The example embodiments may employ sensors and feedback control mechanisms, to ensure a desired amount of spreading is achieved. A controller/processor in the form of a microcontroller enables different settings for the desired amount of spreading to be provided for the spreading apparatus in use as tape passes therethrough. In addition, feedback control variables can also be readily set according to desired operational characteristics such as speed of operation or an acceptable tolerance in the dimensions of the spread tape output from the spreading apparatus. In combination with, or separately from feedback control, empirical techniques may be used to determine the spreading effect of different heating and pressure conditions on different types of tape.

Considering the application of pressure, both a pressure measurement and position measurement for components of the tape spreader, e.g. the position of the compaction shoe relative to the platen, offer a way of regulating the effect of the spreading apparatus on the tape.

Some possible modifications to the spreading apparatuses described herein will now be explained. Whereas the tape spreaders in the example embodiments shown in the Figures have one compaction shoe to press sections of tape against the platen, more than one compaction shoe may be provided. The compaction shoes may have different geometries from one another, according to the amount of spreading to be performed in separate spreading operations. Single roller spreading stages are envisaged as within the present disclosure, as are tape spreaders comprising a plurality of rollers, either in series spreading arrangement to compress the tape against a platen, or opposed rollers to spread the tape as it passes therebetween. The roller options carry with them the risk of damage to the tape by adherence and pulling up of fibres, in a way that is not possible with compression by use of a compaction shoe.

Although heating the tape by contact with a platen enables good stability/temperature regulation at the point at which the tape is spread, other tape heaters/heating methods are also possible, either separately or in combination. For example, a laser and/or infrared heaters, or other radiative heating elements may be used, and/or hot-gas/hot-air. A plurality of heat sources may be used. In one example, the heat source may be configured with a temperature sensor, and the heat source may maintain the heated surface at a steady temperature using feedback control.

The tape heater may comprise a heat source arranged to supply heat indirectly to an incoming tape, for example to heat a surface or thermal mass component that applies heat to the tape. The tape heater may be centrally located between the input side and the output side to in use apply heat to a tape. Application of heat to a tape and application of contact pressure to the tape may occur simultaneously and/or sequentially.

In addition to control, either feedback control or otherwise, of the application of heat and pressure to regulate spreading of tape by the spreading apparatuses described herein, the all embodiments may include a tape feed controller to regulate the movement of tape from the input side of the spreading apparatus to the output side thereof. The tape feed controller may in certain embodiment be configured to move the tape in such a way that no deformation takes place in accordance with the position or movement of the tape. In other embodiments, the tape feed controller may regulate the tension on the tape such that additional elongation takes place. This introduces a further control variable regulating the amount of spreading, as well as improving reproducibility of the tape spreading operation and/or introduces the possibility of changes to fibre orientation being introduced to the tape as part of the tape spreading process.

Figure 3:
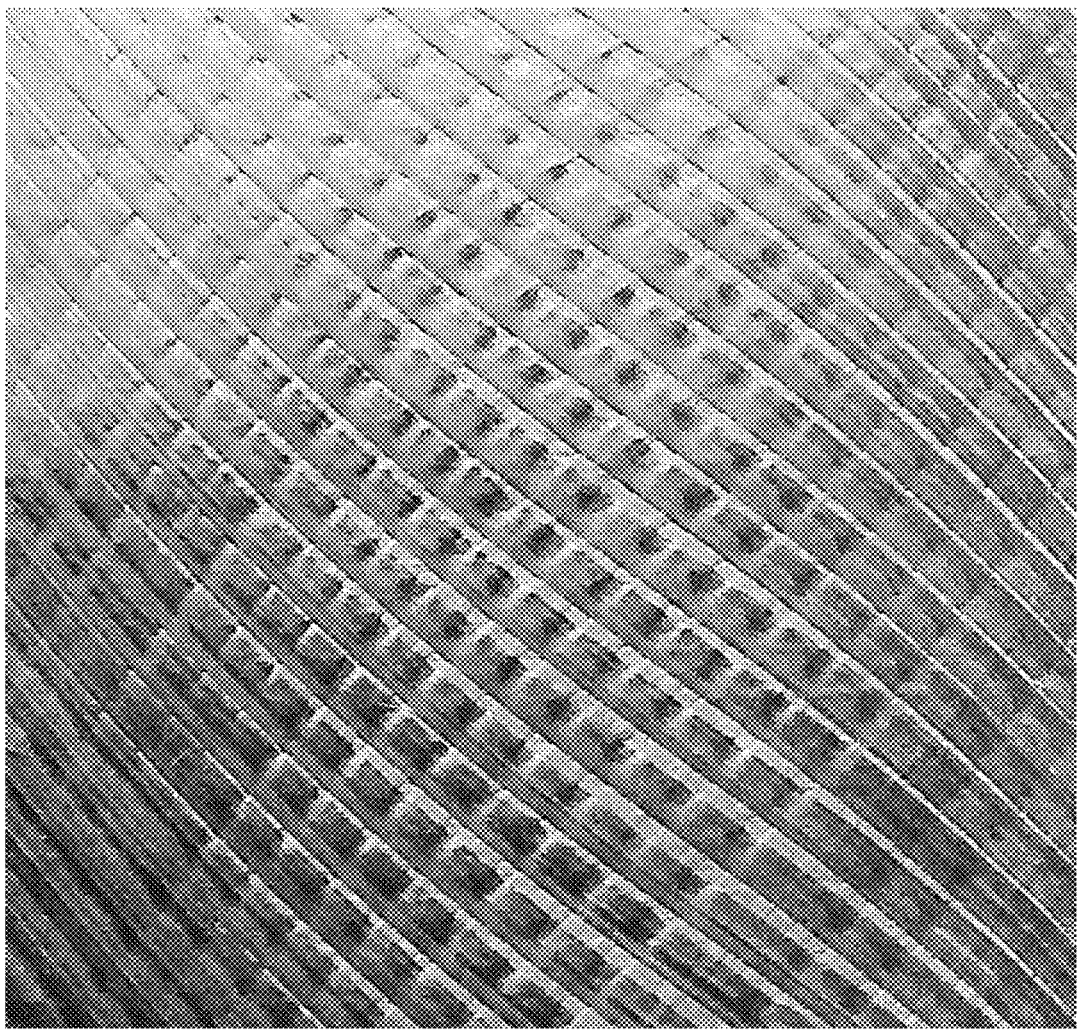
Figure 4:
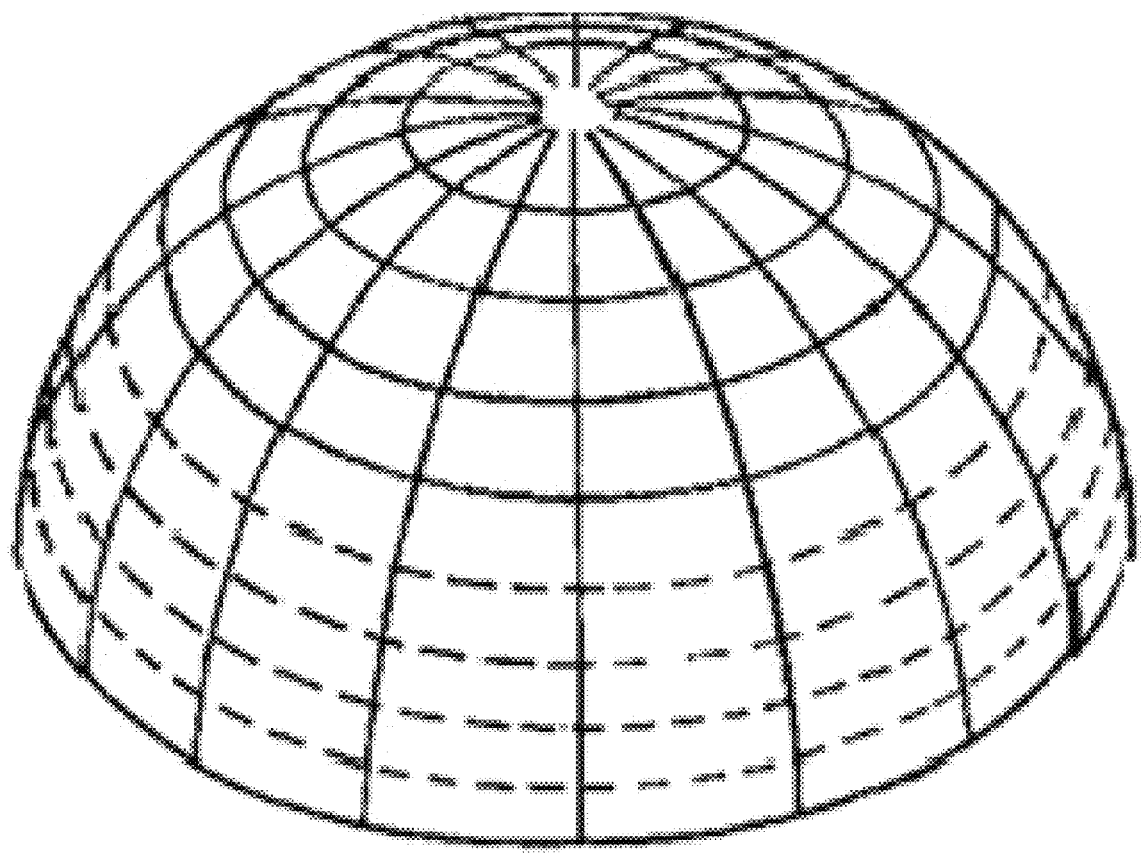
FIG. 4 shows an example of a composite component comprising a doubly curved surface.

As tapes are spread and the thickness reduces, fibres within the tape slip with respect to each other and realign accordingly. The spreading apparatus has the ability to vary tape width during the production process of a component from fibre-reinforced tape. Accordingly, the performance benefits of either lighter or stronger/stiffer structures may be realized by tailoring thickness distributions to meet specific performance requirements, including tuning thickness and fibre orientation independently of each other. Additionally, the performance benefits either lighter or stronger/stiffer structures are realized by minimizing stress and strain concentrations due to local fibre cuts (ply drops) thereby improving strength and damage tolerance properties. Spreading also allows tapes to be more spread over doubly curved surfaces (non-zero Gaussian curvature) without the gaps and overlaps associated with laying constant width tapes on doubly curved surfaces. Example applications include (but are not limited to) nacelles, radomes, twisted fan blades, aircraft wing surfaces and wind turbine blade surfaces. These issues are illustrated in FIGS. 3 and 4. FIG. 3 shows related steered carbon fibre tows with gaps in between. FIG. 4 shows an example of a composite component which varies in width from base to tip over a doubly curved surface that is difficult to produce to high quality using related tape placement methods.

Figure 5:
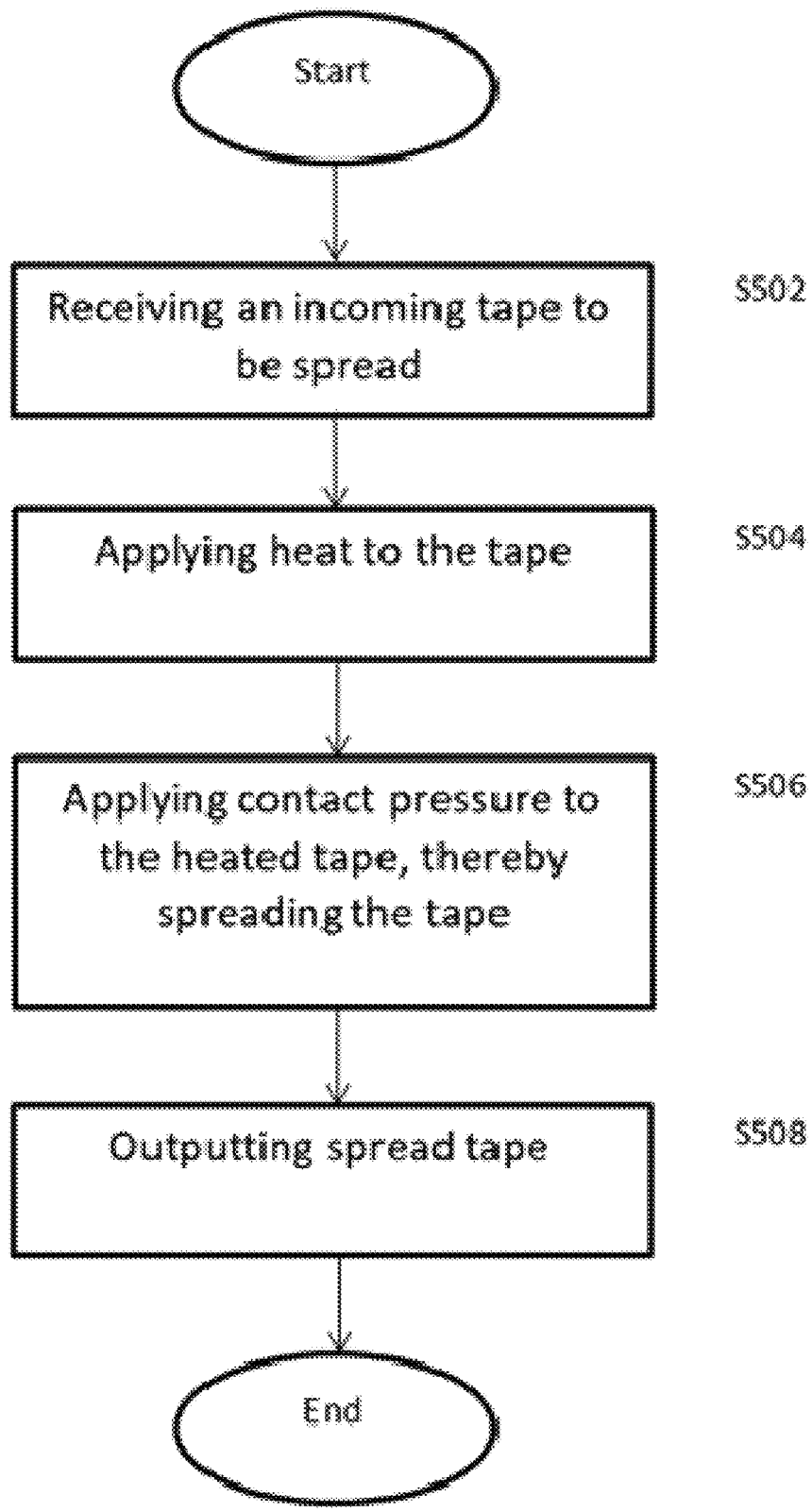
FIG. 5 shows a flowchart illustrating a method of spreading fibre-reinforced composite tapes, according to an example embodiment.

FIG. 5 shows a flowchart of a method of spreading fibre-reinforced composite tapes, according to an example embodiment.

As shown, at step S502, the method comprises receiving an incoming tape to be spread. At step S504, the method comprises a step of applying heat to the tape. At step S506, the method comprises applying contact pressure to the heated tape, thereby spreading the tape. As shown in S508, the method further comprises a step of outputting spread tape.

It will be appreciated, by this method of a fibre-reinforced tape has its in-plane thickness reduced, but its width is increased. Applying heat to the incoming tape in order to raise its temperature renders the tape more easily deformable under contact pressure. Suitably, applying heat may be performed by conduction, radiation or a combination of both, such that a predetermined temperature is reached, according the materials from which the tape is made.

It will be also appreciated that the step of applying heat to a tape and the step of applying contact pressure to the heated tape, thereby spreading the tape may occur simultaneously and/or sequentially. Furthermore, the step of applying contact pressure to the heated tape, thereby spreading the tape may occur more than once, i.e. a plurality of compression operations are envisaged to achieve the desired spreading effect. The spreading apparatus of any embodiment described herein may be used to perform the above-described method of spreading.

The methods and apparatus described are particularly suited to spreading fibre-reinforced composite tapes in which the tape includes a matrix of thermoplastic resin material. The tapes may also comprise carbon fibre, such as prepreg resin-carbon fibre composite tapes. Examples of relevant fibre-reinforced materials those including fibres of carbon, glass and aramid. Thermoplastic resin materials that are relevant include thermoplastic polymers such as PEEK, PEKK, PPS, PP and PA (Nylon). Suitable heating and pressuring of fibre-reinforced tapes in which the tape includes a thermosetting component, such as a thermosetting polymer matrix are also envisaged as providing a tape spreading benefit.

Figure 6:
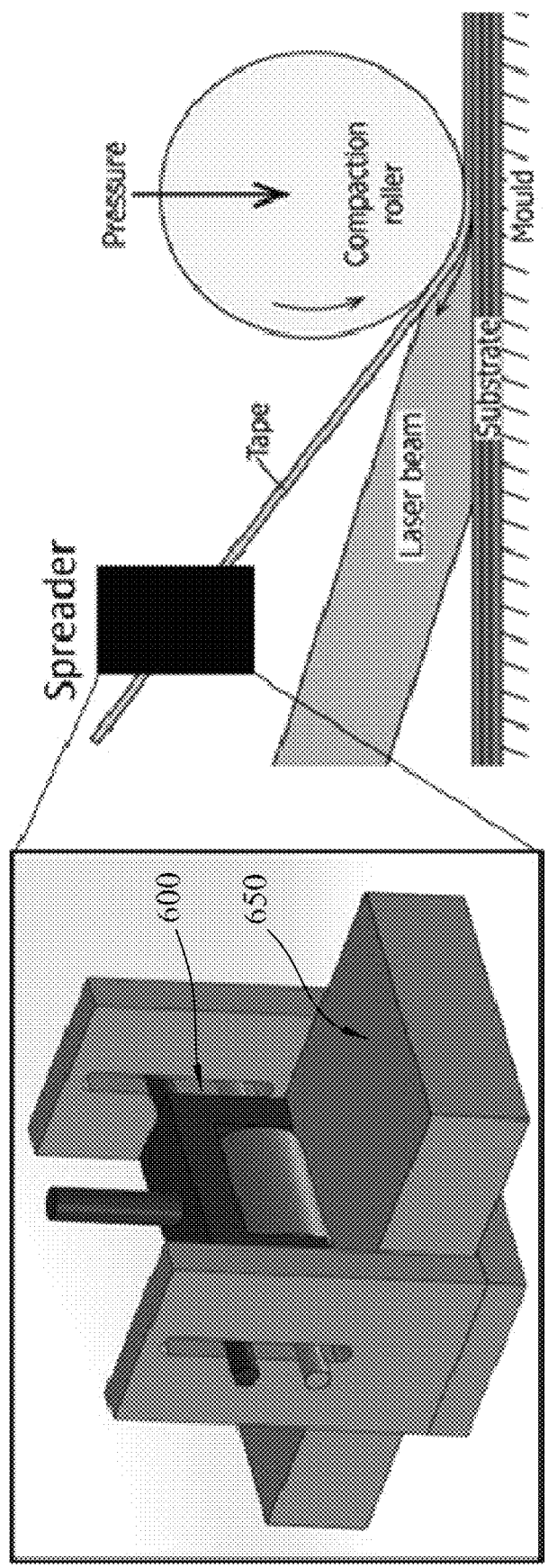
FIG. 6 shows a schematic illustration of a spreading apparatus for fibre-reinforced composite tapes, according to an example embodiment, in use as part of an ATP process.

FIG. 6 shows a schematic of a spreading apparatus for fibre-reinforced composite tapes, according to an example embodiment, as part of the ATP process. The apparatus comprises an input side to receive an incoming tape to be spread, and an output side from which tape is delivered after spreading. The apparatus comprises a tape heater 650 to in use apply heat to a tape, and a tape spreader 600 to in use to apply contact pressure to the heated tape to thereby spread the tape. A spreading apparatus as described herein may be attached to the ATP apparatus in the manner shown. Accordingly, ATP apparatus for in-situ consolidation of fibre-reinforced composite tapes may comprise the spreading apparatus of any preceding embodiment. The skilled person will appreciate that the spreading apparatus of any preceding embodiment may be used in any of Advanced Fibre Placement (AFP) and ATP processes. An example of an ATP process is Laser-Assisted Tape Placement (LATP). ATP processes referred to generally in this document suitably also include processes known as Automated Tape Laying, Automated Fibre Placement, Assisted Tape Placement or Automated Tow Placement.

Figure 7:
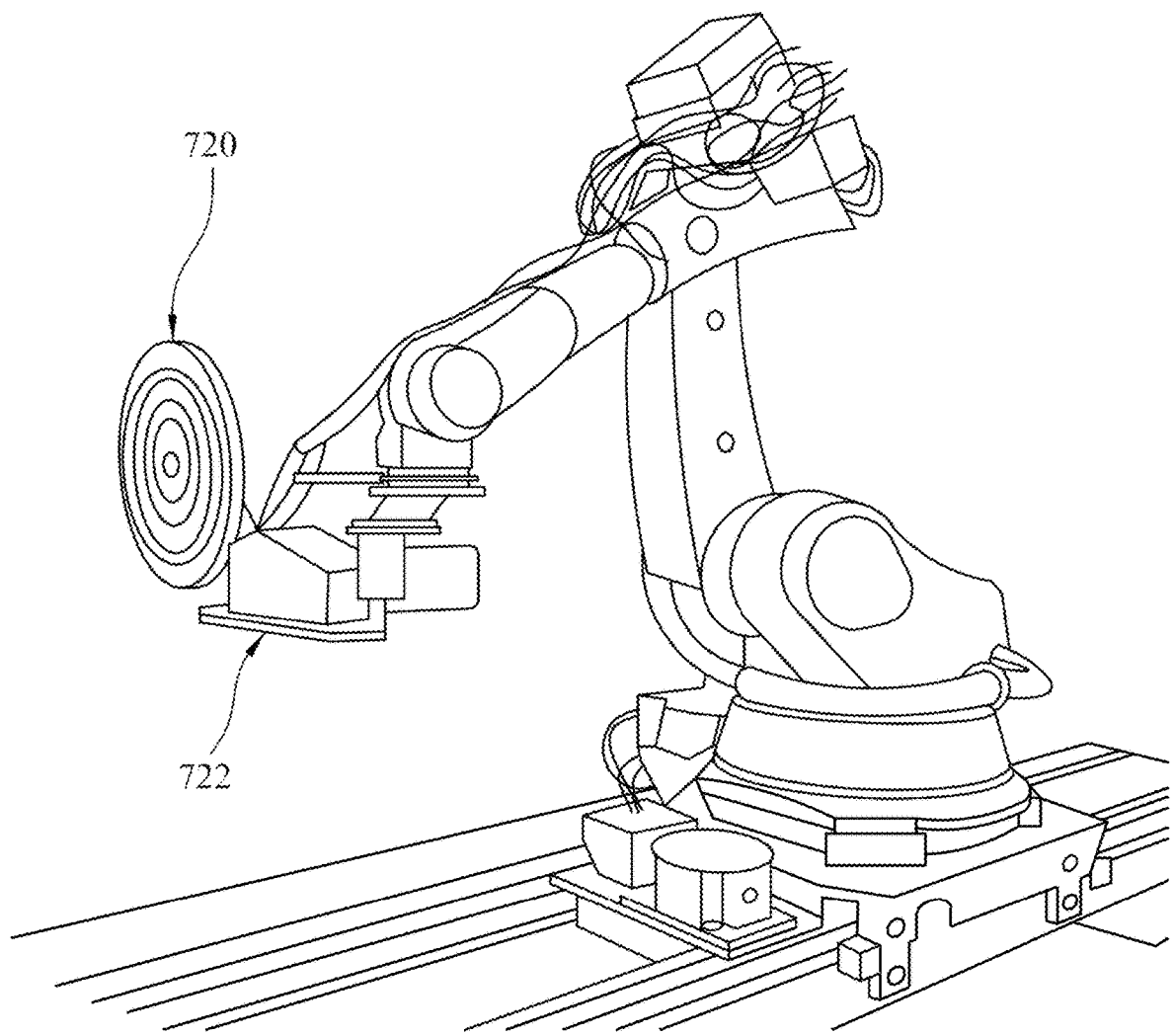
FIG. 7 shows an Automated Tape Placement apparatus that comprises a spreading apparatus for fibre-reinforced composite tapes.

FIG. 7 shows an Automated Tape Placement apparatus that comprises a spreading apparatus for fibre-reinforced composite tapes, according to an example embodiment. The ATP apparatus for in-situ consolidation of fibre-reinforced composite tapes comprises a tape spool unit 720, a controller unit and a head unit 722. The spreading apparatus of any preceding embodiment is attachable to the head unit 722 of the ATP apparatus. Accordingly, the ATP apparatus with the spreading apparatus as described herein are operable to form a composite component. The method of forming a composite component comprises spreading a fibre-reinforced composite tape prior to consolidation in the ATP process using the ATP process apparatus with a spreading apparatus as described herein.

Although the exemplary embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of spreading a fibre-reinforced composite tape comprising a thermoplastic matrix using a spreading apparatus, the spreading apparatus comprising:
    an input side to receive the fibre-reinforced composite tape to be spread, and an output side from which the fibre-reinforced composite tape is delivered after spreading, a heat source arranged to supply heat indirectly to the fibre-reinforced composite tape, and
    a compaction shoe to, during heating of the fibre-reinforced composite tape, apply contact pressure to the fibre-reinforced composite tape to thereby spread the fibre-reinforced composite tape against a planar platen,
    the method performed during Automated Tape Placement forming of a component and comprising:
    receiving the fibre-reinforced composite tape to be spread;
    applying heat indirectly to the fibre-reinforced composite tape;
    applying contact pressure during heating of the fibre-reinforced composite tape to press the fibre-reinforced composite tape against the planar platen, thereby spreading the fibre-reinforced composite tape; and
    outputting a spread fibre-reinforced composite tape having varying widths.

2. A method according to claim 1, wherein the heat source comprises a tape-heating surface that is heated by heat source, and wherein the fibre-reinforced composite tape received at the input side contacts the tape-heating surface such that heat is applied to the fibre-reinforced composite tape by conduction from the tape-heating surface.

3. A method according to claim 2, wherein the heat source is controllable to maintain the tape-heating surface at a steady temperature as the fibre-reinforced composite tape passes to the compaction shoe.

4. A method according to claim 2, wherein the planar platen comprises the tape-heating surface of the heat source.

5. A method according to claim 1, wherein the planar platen is integrated with the heat source.

6. A method according to claim 1, wherein the compaction shoe is driven by an actuator to move in to and out of contact with the fibre-reinforced composite tape in use.

7. A method according to claim 1, wherein the compaction shoe comprises a roller to compress the fibre-reinforced composite tape.

8. A method according to claim 7, wherein the roller is driven by an actuator to move in to and out of contact with the fibre-reinforced composite tape in use.

9. A method according to claim 1, wherein the compaction shoe comprises a roller to compress the fibre-reinforced composite tape against the planar platen.

10. A method according to claim 1, wherein the spreading apparatus further comprises one or both of: an incoming guide positioned on the input side and configured to stabilize the fibre-reinforced composite tape; and an outgoing guide positioned on the output side and configured to stabilize the spread fibre-reinforced composite tape.

11. A method according to claim 1, wherein the spreading apparatus is further configured to regulate movement of the fibre-reinforced composite tape from the input side to the output side in use.

* * * * *